US007022407B2

(12) United States Patent
Furuya et al.

(10) Patent No.: US 7,022,407 B2
(45) Date of Patent: Apr. 4, 2006

(54) POLYESTER FILM FOR CAPACITORS

(75) Inventors: Koji Furuya, Kanagawa (JP); Hiroshi Kusume, Kanagawa (JP); Makoto Handa, Kanagawa (JP)

(73) Assignee: Teijin Limited, Osaka (JP)

(*) Notice: Subject to any disclaimer, the term of this patent is extended or adjusted under 35 U.S.C. 154(b) by 113 days.

(21) Appl. No.: 10/182,553

(22) PCT Filed: Nov. 28, 2001

(86) PCT No.: PCT/JP01/10405

§ 371 (c)(1),
(2), (4) Date: Jul. 30, 2002

(87) PCT Pub. No.: WO02/45105

PCT Pub. Date: Jun. 6, 2002

(65) Prior Publication Data

US 2003/0175537 A1 Sep. 18, 2003

(30) Foreign Application Priority Data

Nov. 29, 2000 (JP) ...................................... 2000-362612
Nov. 29, 2000 (JP) ...................................... 2000-362613
Nov. 29, 2000 (JP) ...................................... 2000-362614

(51) Int. Cl.
*B32B 27/18* (2006.01)
*B32B 27/20* (2006.01)
*B32B 27/36* (2006.01)

(52) U.S. Cl. ....................... 428/331; 428/323; 428/328; 428/329; 428/330; 428/331; 428/480; 428/910; 264/288.4; 264/290.2

(58) Field of Classification Search ................. 428/323, 428/328, 329, 330, 331, 480, 910, 694 ST, 428/694 SL, 694 SG; 264/288.4, 290.2; 528/308
See application file for complete search history.

(56) References Cited

U.S. PATENT DOCUMENTS 4,539,260 A * 9/1985 Abe et al. .................. 428/336
4,724,479 A * 2/1988 Schmalfuss et al. .......... 348/83
5,294,474 A * 3/1994 Assante et al. ............. 428/143
5,885,501 A * 3/1999 Gardner et al. ............. 264/216
5,958,552 A * 9/1999 Fukuda et al. ............. 428/141
6,106,926 A 8/2000 Kurz et al.
6,139,952 A * 10/2000 Furuya et al. .............. 428/339
6,235,371 B1 * 5/2001 Mitsuhashi et al. ......... 428/141
6,303,210 B1 * 10/2001 Watanabe et al. ........... 428/141
6,303,228 B1 * 10/2001 Watanabe et al. ........ 428/423.7
6,391,441 B1 * 5/2002 Yano et al. ................. 428/343
6,440,532 B1 * 8/2002 Ogawa et al. .............. 428/141
6,503,599 B1 * 1/2003 Tojo et al. .................. 428/141
6,524,719 B1 * 2/2003 Yamane et al. .......... 428/474.7
6,532,119 B1 * 3/2003 Martinez, Sr. .............. 359/884
6,537,657 B1 * 3/2003 Watanabe et al. ........... 428/331
6,761,968 B1 * 3/2003 Watanabe et al. ........... 428/328
6,855,758 B1 * 2/2005 Murschall et al. .......... 524/195
2001/0036545 A1 * 11/2001 Nishi et al. .............. 428/315.7

FOREIGN PATENT DOCUMENTS

| | | |
|---|---|---|
| AU | 735548 | 9/1998 |
| EP | 0 924050 A2 | 6/1999 |
| EP | 1 113 467 A1 | 7/2001 |
| JP | 10 027727 | 1/1998 |
| JP | 10-294237 A | 11/1998 |
| JP | 11-135358 A | 5/1999 |
| JP | 11-135358 | 5/1999 |
| JP | 11 168267 | 6/1999 |
| JP | 2000 277374 | 10/2000 |
| WO | WO 00/74947 | * 12/2000 |
| WO | WO 02/45105 A1 | 6/2002 |

* cited by examiner

*Primary Examiner*—Vivian Chen
(74) *Attorney, Agent, or Firm*—Sughrue Mion, PLLC

(57) ABSTRACT

A film which is a biaxially oriented film comprising polyethylene-2,6-naphthalenedicaboxylate as a principal component, having a thermal strain ratio RMD (150) in the machine direction of the film at a temperature of 150° C. is $-1.5\% \leqq \text{RMD}(150) \leqq 0.0\%$ when the thermal strain ratio RMD (T) in the machine direction of the film at a temperature T° C. based on the length LMD (t) in the machine direction (MD) of the film at a temperature t° C. is defined by $$RMD(T)=\{[LMD(T)-LMD(35)]/LMD(35)\}\times 100(\%),$$

excellent in insulation characteristics without lowering processing characteristics, especially the characteristics during hot-pressing and suitable as a dielectric for capacitors.

14 Claims, No Drawings

POLYESTER FILM FOR CAPACITORS

TECHNICAL FIELD

The present invention relates to a polyester film for capacitors.

BACKGROUND ART

Miniaturization and larger capacity are demanded according to the miniaturization of electronic and electrical equipment in capacitors and an improvement in insulating characteristics is simultaneously demanded according to the higher voltage the capacitors are used. In response to the demands, in film capacitors, studies have been made on thinner films as a dielectric and on a reduction in pinholes present in films. The electrostatic capacity based on unit volume of the film as the dielectric is in inverse proportion to the square of the film thickness and in proportion to the permittivity of the dielectric. Although the miniaturization and larger capacity of capacitors can be achieved in film capacitors by forming thinner films which are dielectrics, operating efficiency is lowered in processing steps of capacitors, and especially the operating efficiency is lowered in steps of metal vapor deposition on films and slit processing and winding for stacking a film of a piece of capacitor. A proposal was made for a method for suppressing the deterioration in operating efficiency by adding specific inert fine particles as a lubricant into a polyethylene-2,6-naphthalenedicarboxylate film [JP-A (JP-A refers to Japanese Unexamined Patent Publication) No. 10-294237].

DISCLOSURE OF THE INVENTION

The methods mentioned above are excellent methods in that excellent operating efficiency can be obtained in processing steps of capacitors while forming thinner films; however, defective insulating characteristics due to additives, especially lubricants contained in the films may be caused, and the resulting films are still insufficient as films for capacitors. There is a tendency to increase the temperature and pressure of hot-pressing after winding for stacking a film of a piece of capacitor, and insulation resistance or withstand voltage as the piece of capacitor may be lowered from that of a film simple material.

An object of the present invention is to solve the problems of the prior art and to provide a polyester film for capacitors comprising polyethylene-2,6-naphthalenedicarboxylate as a principal component and excellent in insulating characteristics and processability.

The present invention is a constitution of the following item 1 and includes items 2 to 14 as preferred modes.

item 1. A polyester film for capacitors which is a biaxially oriented film comprising polyethylene-2,6-naphthalenedicarboxylate as a principal component and having a thermal strain ratio RMD (150) of the film in the machine direction at a temperature of 150° C. is $$-1.5\% \leqq RMD(150) \leqq -0.0\%$$

when the thermal strain ratio RMD (T) in the machine direction at a temperature T° C. based on the length LMD (t) in the machine direction (MD) of the film at a temperature t ° C. is defined by $$RMD(T)=\{[LMD(T)-LMD(35)]/LMD(35)\}\times 100(\%).$$

item 2. The polyester film for capacitors according to item 1, characterized in that the thermal strain ratio RTD (150) in the transverse direction of the film at a temperature of 150° C. is $$-1.0\% \leqq RTD(150) \leqq 0.0\%$$

when the thermal strain ratio RTD (T) in the machine direction of the film at a temperature T ° C. based on the length LTD (t) in the transverse direction (TD) of the film at a temperature t ° C. is defined by $$RTD(T)=\{[LTD(T)-LTD(35)]/LTD(35)\}\times 100(\%).$$

item 3. The polyester film for capacitors according to item 2, characterized in that the thermal strain ratios RMD (210) and RTD (210) at a temperature of 210° C. are $$-3.5\% \leqq RMD(210) \leqq 0.0\% \text{ and}$$

$$-3.5\% \leqq RTD(210) \leqq 0.0\%.$$

item 4. The polyester film for capacitors according to item 3, characterized in that the ratio of the 5% strain strength in the machine direction of the film to the 5% strain strength in the transverse direction of the film is 0.90 or more and 1.40 or less.

item 5. The polyester film for capacitors according to any of items 1 to 4, characterized in that the number of fry specks having an average diameter exceeding 60 μm is 20 fly specks/m$^2$ or less.

item 6. The polyester film for capacitors according to any of items 1 to 5 characterized in that the number of fry specks having an average diameter exceeding 30 μm is 10 fly specks/m$^2$ or less.

item 7. The polyester film for capacitors according to any of items 1 to 6, characterized in that the number of coarse particles present in the film and having the maximum diameter exceeding 40 μm is 10 coarse particles/m$^2$ or less.

item 8. The polyester film for capacitors according to item 5, characterized in that 0.03 to 2% by weight of calcium carbonate particles having an average particle diameter of 0.2 to 5 μm is contained and 0.03 to 1% by weight of platy aluminum silicate particles having an average particle diameter of 0.1 to 2 μm is contained.

item 9. The polyester film for capacitors according to item 8, characterized in that the number of coarse particles having the maximum diameter exceeding 35 μm is 10 coarse particles/m$^2$ or less.

item 10. The polyester film for capacitors according to item 7, characterized in that a porous silica and a spherical silica are contained, the porous silica particles have an average particle diameter of 0.5 to 5 μm, the spherical silica particles have an average particle diameter of 0.05 to 1.5 μm and less than the film thickness, the spherical silica particles further have a particle diameter ratio of 1.0 to 1.2, the content of the porous silica particles is 0.05 to 2% by weight and the content of the spherical silica particles is 0.01 to 1% by weight.

item 11. The polyester film for capacitors according to item 10, characterized in that the number of fly specks having an average diameter exceeding 55 μm is 15 fly specks/m$^2$ or less.

item 12. The polyester film for capacitors according to item 6, characterized in, that two kinds of spherical silica particles different in average diameter are contained.

item 13. The polyester film for capacitors according to item 12, characterized in that the two kinds of spherical silica different in average particle diameter are spherical silica particles (A) having an average particle diameter of 0.5 to 3.0 μm and spherical silica particles (B) having an average particle diameter of 0.01 to 1.5 μm, the spherical silica particles (A) and the spherical silica particles (B) each have a particle diameter ratio of 1.0 to 1.2, the content of the spherical silica particles (A) is 0.03 to 1.5% by weight and the content of the spherical silica particles (B) is 0.05 to 2% by weight.

item 14. The polyester film for capacitors according to any of items 9, 11 and 13, characterized in that the film is produced according to a simultaneous biaxial stretching method.

The present invention will be explained in more detail.

<<Polyethylene-2,6-naphthalenedicarboxylate>>

The polyester film for capacitors of the present invention comprises polyethylene-2,6-naphthalenedicarboxylate as a principal component. On the other hand, the conventional polyester film for capacitors comprises polyethylene terephthalate as a principal component and has a possibility of increasing the dielectric dissipation factor in a temperature region of 80° C. or above, self-heating by the dielectric loss and causing thermal runaway. Thereby, the upper limit of the service temperature of the conventional polyester film for capacitors as a capacitor is limited to about 80° C. In contrast to this, the polyethylene-2,6-naphthalenedicarboxylate in the present invention increases the dielectric dissipation factor from the vicinity of 120° C. and the upper limit of the service temperature, therefore, is about 120° C. Accordingly, the polyester film for capacitors of the present invention can be used in environment at a higher temperature than that of the conventional polyester film for capacitors.

The polyethylene-2,6-naphthalenedicarboxylate used in the present invention is a polyester in which the main dicarboxylic acid component is naphthalenedicarboxylic acid and the main glycol component is ethylene glycol. Examples of the naphthalenedicarboxylic acid include 2,6-naphthalenedicarboxylic acid, 2,7-naphthalenedicarboxylic acid and 1,5-naphthalenedicarboxylic acid. Above all, 2,6-naphthalenedicarboxylic acid is preferable.

In the present invention, “comprises polyethylene-2,6-naphthalenedicarboxylate as a principal component” means that at least 90 mole %, preferably at least 95 mole % of the whole recurring units in the constituent component of the polymer constituting the film is ethylene-2,6-naphthalenedicarboxylate.

A polymer which is capable of ensuring insulating characteristics, mechanical characteristics and thermal dimensional stability may be used as the polymer constituting the polyester film for capacitors of the present invention and the polymer may be a copolymer or a blend comprising the polyethylene-2,6-naphthalenedicarboxylate as the principal component.

When the copolymer is used, a compound having two ester-forming functional groups in the molecule can be used as a copolymerization component constituting the copolymer other than the ethylene-2,6-naphthalenedicarboxylate which is the principal component. Examples of the compound include dicarboxylic acids such as oxalic acid, adipic acid, phthalic acid, sebacic acid, dodecanedicarboxylic acid, isophthalic acid, terephthalic acid, 1,4-cyclohexanedicarboxylic acid, 4,4'-diphenyldicarboxylic acid, phenylindanedicarboxylic acid, 2,7-naphthalenedicarboxylic acid, tetralindicarboxylic acid, decalinedicarboxylic acid and diphenyl etherdicarboxylic acid; hydroxycarboxylic acids such as p-hydroxybenzoic acid and p-hydroxyethoxybenzoic acid; dihydric alcohols such as propylene glycol, trimethylene glycol, tetramethylene glycol, hexamethylene glycol, cyclohexanemethylene glycol, neopentyl glycol, ethylene oxide adducts of bisphenol sulfone, ethylene oxide adducts of bisphenol A, diethylene glycol, polyethylene oxide glycol and the like. One kind of the compounds may be used and two or more kinds may be used in combination. Preferable dicarboxylic acids in the components are isophthalic acid, terephthahic acid, 4,4'-diphenyldicarboxylic acid, 2,7-naphthalenedicarboxylic acid and p-hydroxybenzoic acid and preferable glycol components are trimethylene glycol, hexamethylene glycol, neopentyl glycol and ethylene oxide adducts of bisphenol sulfone.

A part or all of terminal hydroxy groups and/or carboxy groups of the polyethylene-2,6-naphthalenedicarboxylate may be terminated with a monofunctional compound, for example benzoic acid or a methoxypolyalkylene glycol or may be a copolymer with a trace amount of an ester-forming compound having three or more functional groups such as glycerol or pentaerythritol within the range so as to provide a substantially linear polymer.

The polymer of the polyester film for capacitors of the present invention may be a blend; however, the polyethylene-2,6-naphthalenedicarboxylate may contain an organic polymer when the polymer is the blend. In this case, 90 mole % or more of the polyethylene-2,6-naphthalenedicarboxylate is preferably contained in the polymer.

Examples of the organic polymer include polyethylene terephthalate, polyethylene isophthalate, polytrimethylene terephthalate, polyethylene 4,4'-tetramethylenediphenyldicarboxylate, polyethylene-2,7-naphthalenedicarboxylate, polytrimethylene-2,6-naphthalenedicarboxylate, polyneopentylene-2,6-naphthalenedicarboxylate and poly(bis(4-ethyleneoxyphenyl)sulfone)-2,6-naphthalenedicarboxylate. Above all, polyethylene isophthalate, polyrtimethylene terephthalate, polytrimethylene-2,6-naphthalenediacrboxylate and poly(bis(4-ethyleneoxyphenyl)sulfone)-2,6-napthalenedicarboxylate are preferable.

One kind of the organic polymer may be used and two or more kinds may be used in combination.

Polyethylene-2,6-naphthalenedicarboxylate can be produced by a conventionally known method. For example, the polyethylene-2,6-naphthalenedicarboxylate can be produced according to a method for directly providing a polyester having a low degree of polymerization by a reaction of a dicarboxylic acid with a glycol or can be produced by carrying out transesterification of a lower alkyl ester of a dicarboxylic acid with a glycol using a transesterification catalyst and then conducting polymerization using a polymerization catalyst. For example, one or two or more kinds of compounds containing sodium, potassium, magnesium, calcium, zinc, strontium, titanium, zirconium, manganese or cobalt can be used as the transesterification catalyst. Examples of the polymerization catalyst include antimony compounds such as antimony trioxide or antimony pentoxide, germanium compounds such as germanium dioxide or titanium compounds such as tetraethyl titanate, tetrapropyl titanate, tetraphenyl titanate or partial hydrolyzates thereof, ammonium titanyl oxalate, potassium titanyl oxalate or titanium trisacetylacetonate.

When polymerization is carried out through transesterification, a phosphorus compound such as trimethyl phosphate, triethyl phosphate, tri-n-butyl phosphate or orthophosphoric acid is usually added for the purpose of deactivating the transesterification catalyst before polymerizing reaction. In the present invention, it is preferable that the content of phosphorus element in the polyethylene-2,6-naphthalenedicarboxylate is 20 to 100 ppm from the viewpoint of thermal stability of the polyester.

Furthermore, the polyester may be formed into chips after melt polymerization and subjected to solid-phase polymerization under heating decompression or in an inert gas stream such as nitrogen.

The intrinsic viscosity of the polyester used as the polyester film for capacitors of the present invention is preferably 0.40 to 0.90 dl/g, more preferably 0.43 to 0.85 dl/g, especially preferably 0.45 to 0.80 dl/g when the film of the polyester is used as a sample. When the intrinsic viscosity is less than 0.40 dl/g, it is undesirable that the film becomes brittle and breakage during the formation of the film tends to occur to readily cause the breakage of the film in transportation in processing steps of the capacitors. On the other hand, when the intrinsic viscosity exceeds 0.90 dl/g, it is undesirable that the intrinsic viscosity of the polymer must be considerably increased, a long time is required for polymerization according to a usual synthetic technique and the productivity is deteriorated.

<<Thermal Strain Ratio RMD (150) and RTD (150)>>

The thermal strain ratio RMD (T) in the machine direction of a film at a temperature T ° C. is defined by $$RMD(T)=\{[LMD(T)-LMD(35)]/LMD(35)\}\times 100(\%)$$

based on the length LMD (t) in the machine direction (MD) of the film at a temperature t ° C., wherein the LMD (35) is the length in the machine direction (MD) of the film at a temperature of 35° C. Namely, in the present invention, the thermal strain ratio of the film is defined by a degree of change in the film length changing with temperature based on the film length at a temperature of 35° C. The film of the present invention is characterized in that the thermal strain ratio RMD (150) in the machine direction of the film at a temperature of 150° C. is $$-1.5\%\leqq RMD(150)\leqq 0.0$$

When the thermal strain ratio RMD (150) at 150° C. is less than −1.5%, the film shrinks in a process for providing the surface of the film with a metal layer and the planarity is lowered to thereby deteriorate the dielectric loss of capacitors. On the other hand, when the RMD (150) exceeds 0.0%, a defective shape is sometimes caused during hot-pressing and insulation resistance is lowered.

In the present invention, the thermal strain ratio RTD (150) in the transverse direction of the film at a temperature of 150° C. is preferably −1.0%≦RTD (150)≦0.0% when the thermal strain ratio RTD (T) in the machine direction of the film at a temperature T ° C. based on the length LTD (t) in the transverse direction (TD) of the film at a temperature t ° C. is defined by $$RTD(T)=\{[LTD(T)-LTD(35)]/LTD(35)\}\times 100(\%).$$

When the RTD (150) is less than −1.0%, the film shrinks in a process for providing the surface of the film with a metal layer and the electrostatic capacity is sometimes insufficient. On the other hand, when the RTD (150) exceeds 0.0%, it is undesirable that the metallized film causes curling after providing the surface with the metal layer and the yield is sometimes lowered.

<<Thermal Strain Ratios RMD (210) and RTD (210)>>

In the present invention, the thermal strain ratios RMD (210) and RTD (210) at a temperature of 210° C. are preferably $$-3.5\%\leqq RMD(210)\leqq 0.0\% \text{ and}$$

$$-3.5\%\leqq RTD(210)\leqq 0.0\%.$$

When at least one of the thermal strain ratio RMD (210) and the thermal strain ratio RTD (210) at 210° C. is less than −3.5% or exceeds 0.0%, it is undesirable that defective contact is caused by deformation of the film and capacity becomes sometimes insufficient during metallicon (thermal spraying of an electrode metal on both end faces of a piece of capacitor).

<<Machine Direction/Transverse Direction Ratio of 5% Strain Strength>>

In the present invention, the ratio of 5% strain strength in the machine direction to the 5% strain strength in the transverse direction of the film, i.e. a value obtained by dividing the 5% strain strength in the machine direction by the 5% strain strength in the transverse direction is preferably 0.90 to 1.40. When the value is less than 0.90, it is undesirable that the film readily elongates in the machine direction during processing. When the value exceeds 1.40, it is undesirable that the thermal strain ratio RMD (150) in the machine direction (MD) at 150° C. is sometimes less than −1.5%.

<<Center Line Average Height (Ra)>>

The center line average height (Ra) of the film for capacitors of the present invention is preferably 35 to 90 nm. When the center line average height (Ra) is less than 35 nm, it is undesirable that slipperiness and air escaping property of the film are inferior, the winding of the film into a roll becomes extremely difficult, collapsing property of the piece of capacitor during hot-pressing is inferior and defective shape and lowering of insulation resistance are sometimes caused. The defective shape herein described is caused by defective slipperiness and is a phenomenon in which a collapse mark in the center of the piece of capacitor does not become rectilinear and a strain is caused or dumbbelled voids remain at both ends of the collapse mark. On the other hand, it is necessary to add a lubricant having a large particle diameter or increase the amount of the added lubricant in order to obtain a film having a center line average height (Ra) exceeding 90 nm; however, it is undesirable that the thickness of the polyester film for capacitors of the present invention is small and the breakage frequency during the formation of the film is resultantly increased to markedly lower the productivity or it is undesirable that the breakdown voltage of the capacitors is lowered.

In addition, when the polyester film for capacitors of the present invention contains calcium carbonate particles and platy ammonium silicate particles, the preferable range of the center line average height (Ra) is 40 to 80 nm and the far more preferable range is 45 to 80 nm with the especially preferable range of 50 to 77 nm.

When the polyester film for capacitors of the present invention contains porous silica and spherical silica, the more preferable range of the center line average height (Ra) is 40 to 90 nm and the far more preferable range is 45 to 87 nm with the especially preferable range of 50 to 85 nm.

When the polyester film for capacitors of the present invention contains two kinds of spherical silica different in average particle diameter, the more preferable range of the center line average height (Ra) is 35 to 75 nm and the far more preferable range is 40 to 70 nm with the especially preferable range of 45 to 67 nm.

<<Ten-Point Average Roughness (Rz)>>

The ten-point average roughness (Rz) of the polyester film for capacitors of the present invention is preferably 900 to 1800 nm. When the ten-point average roughness is less than 900 nm, it is undesirable that the slipperiness and air escaping property of the film are inferior, the winding of the film into a roll becomes extremely difficult, collapsing property of the piece of capacitor during hot-pressing is inferior and the defective shape and lowering of insulation resistance are sometimes caused. It is necessary to add a lubricant having a large particle diameter or increase the amount of the added lubricant in order to obtain a film having a ten-point average roughness exceeding 1800 nm; however, it is undesirable that the thickness of the polyester film for capacitors of the present invention is small and the breakage frequency during the formation of the film is resultantly increased to markedly lower the productivity or it is undesirable that the breakdown voltage of the capacitors is lowered in this case.

When the polyester film for capacitors of the present invention contains porous silica and spherical silica, the more preferable range of the ten-point average roughness is 1000 to 1800 nm and the more preferable range is 1100 to 1750 nm with the especially preferable range of 1200 to 1700 nm.

When the polyester film for capacitors of the present invention contains two kinds of spherical silica different in average particle diameter, the more preferable range of the ten-point average roughness is 900 to 1500 nm and the far more preferable range is 1000 to 1450 nm with the especially preferable range of 1100 to 1400 nm.

<<Thickness>>

The thickness of the polyester film for capacitors of the present invention is preferably 0.3 to 10 μm, more preferably 0.3 to 7.0 μm, far more preferably 0.4 to 7.0 μm, still far more preferably 0.4 to 6.0 μm, especially preferably 0.5 to 5.0 μm. When the film thickness is less than 0.3 μm, it is undesirable that the breakage frequently occurs during the film formation and the film formation is difficult. When the film thickness exceeds 10 μm, a phenomenon of lowering of insulating characteristics does not occur and there is no problem about lowering of dielectric strength by pressing because the sufficient resin thickness can be maintained even if fly specks are present. Therefore, this case does not become an object of the present invention.

<<Dispersion of Thickness>>

The dispersion of thickness of the polyester film for capacitors of the present invention in an optional site on the film is preferably 25% or less, more preferably 20% or less, especially preferably 15% or less based on the film thickness. When the dispersion of thickness based on the thickness of the film exceeds 25%, it is undesirable that the dispersion of performances as capacitors is caused by the dispersion of the thickness when the film as a thin film for a dielectric of the capacitors is laminated several times for use.

<<Density>>

The density of the polyester film for capacitors of the present invention is preferably 1.340 to 1.361 g/cm$^3$, more preferably 1.345 to 1.357 g/cm$^3$. When the density is less than 1.340 g/cm$^3$, it is undesirable that a dispersion of capacitor performances is caused to bring about the lowering of processing yield. When the density exceeds 1.361 g/cm$^3$, it is undesirable that the crystallinity becomes too high to lose the toughness of the film and the breakage frequency during transportation of the film or slit processing is resultantly increased.

<<Calcium Carbonate Particles and Platy Aluminum Silicate Particles>>

When calcium carbonate particles are contained in the polyester film for capacitors of the present invention, the average particle diameter of the calcium carbonate particles is preferably 0.2 to 5 μm, more preferably 0.3 to 4 μm, especially preferably 0.5 to 3 μm from the viewpoint of the slipperiness and air escaping property of the film. The amount of the added calcium carbonate particles is preferably 0.03 to 2% by weight, more preferably 0.05 to 1.5% by weight, especially preferably 0.1 to 1% by weight.

Examples of the calcium carbonate in the present invention include calcite crystals such as naturally occurring limestone and chalk (whiting) and precipitated calcium carbonate produced from limestone by a chemical method; argonite crystals obtained by reacting milk of lime with gaseous carbon dioxide at high temperatures, vaterite crystals and a combination thereof. Calcium carbonate heavy (calcite crystals) obtained by mechanically pulverizing limestone can also be used.

When platy aluminum silicate particles are contained in the polyester film for capacitors of the present invention, the average particle diameter of the platy aluminum silicate particles is preferably 0.1 to 2 μm, more preferably 0.3 to 1.7 μm, especially preferably 0.5 to 1.5 μm. The amount of the added platy aluminum silicate particles is preferably 0.03 to 1% by weight, more preferably 0.06 to 0.8% by weight, especially preferably 0.1 to 0.7% by weight from the viewpoint of slipperiness of the film and handleability in the production process for capacitors.

In the present invention, the platy aluminum silicate refers to an aluminosilicate and examples include kaolin clay comprising naturally occurring kaolin minerals. Furthermore, the kaolin clay may be subjected to refining treatment such as washing with water.

When the polyester film for capacitors of the present invention contains calcium carbonate particles and platy aluminum silicate particles, the number of fly specks having an average diameter exceeding 60 μm is preferably 20 fly specks/m$^2$ or less, more preferably 15 fly specks/m$^2$ or less, especially preferably 10 fly specks/m$^2$ or less. The fly specks markedly lowering insulating performances have an average diameter exceeding 60 μm and it is undesirable that insulating performances as a dielectric of the capacitors are insufficient when the frequency of presence of the fly specks exceeds 20 fly specks/m$^2$.

Furthermore, the fly specks occur from additives (lubricants or the like) or foreign materials contained in the resin as nuclei and are composed of the nuclei and parts (voids) in which the film thickness of resins constituting the film formed in the periphery thereof is reduced. The average diameter of the fly specks is the average of the major axis and the minor axis of the fly specks.

<<Porous Silica Particles and Spherical Silica Particles>>

When porous silica particles are contained in the polyester film for capacitors of the present invention, the porous silica particles are preferably composed of aggregates of primary particles having an average particle diameter of 0.001 to 0.1 μm. The porous silica particles exhibit a high affinity for polyethylene-2,6-naphthalenedicarboxylate; however, coarse particles are frequently present because the porous silica particles are composed of the aggregates. The coarse particles contained in the film cause lowering of performances of the polyester film for capacitors. When the average particle diameter of the primary particles is less than 0.001 μm, it is undesirable that the particle surface area is increased, particles resultantly tend to mutually aggregate and coarse aggregates are produced. When the average particle diameter of the primary particles exceeds 0.1 μm, it is undesirable that the porosity of the particles is lost, and the affinity for polyethylene-2,6-naphthalenedicarboxylate is lost and voids readily occur around the lubricant to deteriorate insulating characteristics.

The average particle diameter of the primary particles can be measured as follows. Individual particles of a powder to be a sample are initially scattered. A metal vapor deposition film is then formed on the surface at a thickness of 200 to 300 Å with a gold sputtering device. The resulting metal vapor deposition film is observed at 10000 to 30000 times under a scanning type electron microscope and image processing is carried out with Luzex 500 manufactured by Nippon Regulator Co., Ltd. Thereby, the average particle diameter can be measured.

The average particle diameter as the aggregates of the porous silica particles is preferably 0.5 to 5 μm, more preferably 0.7 to 4.0 μm, especially preferably 1.0 to 3.0 μm from the viewpoint of slipperiness and deairing properties of the film. The amount of the added porous silica particles is preferably 0.05 to 2% by weight, more preferably 0.07 to 1.8% by weight, especially preferably 0.1 to 1.5% by weight.

The pore volume of the porous silica particles is preferably 0.5 to 2.0 ml/g, more preferably 0.6 to 1.8 ml/g. When the pore volume is less than 0.5 ml/g, it is undesirable that the porosity is poor and the affinity for polyethylene-2,6-naphthalenedicarboxylate is lost. When the pore volume exceeds 2.0 ml/g, it is undesirable that the aggregation tends to occur and the adjustment of the particle diameter becomes difficult.

When the spherical silica particles are contained in the polyester film for capacitors of the present invention, the deterioration in slipperiness of the film due to lowering of particle diameter by disintegration of the porous silica particles in an extruding step or a recovering step in production of the film can be suppressed thereby.

The average particle diameter of the spherical silica particles is preferably 0.05 to 1.5 μm. The average particle diameter is preferably smaller than the film thickness in order to stably produce the film. Furthermore, the average particle diameter is preferably 90% or less based on the film thickness and especially preferably 80% or less based on the film thickness.

The amount of the added spherical silica particles is preferably 0.01 to 1% by weight, more preferably 0.03 to 0.9% by weight from the viewpoint of slipperiness and windability of the film and handleability in the production process for the capacitors. The particle diameter ratio (major axis/minor axis) of the spherical silica particles is preferably 1.0 to 1.2.

The number of fly specks having an average diameter exceeding 55 μm is preferably 15 fly specks/$m^2$ or less, more preferably 10 fly specks/$m^2$ or less, especially preferably 8 fly specks/$m^2$ or less. The average diameter of fly specks markedly lowering insulating performances exceeds 55 μm. When the frequency of presence of the fly specks exceeds 15 fly specks/$m^2$, it is undesirable that the insulating performances as a dielectric of capacitors are insufficient.

<<Spherical Silica Particles (A) and (B)>>

When spherical silica particles are contained in the polyester film for capacitors of the present invention, 0.03 to 1.5% by weight of the spherical silica particles (A) having an average particle diameter of 0.5 to 3.0 μm is preferably contained and 0.05 to 2% by weight of the spherical silica particles (B) having an average particle diameter of 0.01 to 1.5 μm is preferably contained. The spherical silica particles (A) and the spherical silica particles (B) each have a particle diameter ratio (aspect ratio) of preferably 1.0 to 1.2. The average particle diameter of the spherical silica particles (A) is preferably larger than that of the spherical silica particles (B). Furthermore, the average particle diameter of the spherical silica particles (A) is more preferably 0.8 to 2.5 μm and the average particle diameter of the spherical silica particles (B) is more preferably 0.01 to 1.2 μm.

Since the two kinds of the spherical silica particles each have a particle diameter ratio of 1.0 to 1.2, the shape of the individual fine particles is extremely close to a sphere and is characterized in that the spherical silica particles are remarkably different from silica fine particles which are heretofore known as a lubricant and are ultrafine massive particles of about 10 nm or aggregates (agglomerate particles) of about 0.5 μm formed from the ultrafine massive particles by aggregation. When the particle diameter ratio exceeds 1.2, the contribution to surface roughness is reduced and voids tend to form in the interface between the particles and the polymer.

The particle diameter ratio (aspect ratio) herein is determined by Particle diameter ratio=average major axis of spherical silica fine particles/average minor axis of spherical silica fine particles. Furthermore, the average major axis and the average minor axis are determined by the average of numerical values of the major axis and minor axis of optionally selected sample particles.

When the average particle diameter of the spherical silica particles (A) is less than 0.5 μm, improving effects on the slipperiness or operating efficiency of the film are insufficient. On the other hand, when the average particle diameter exceeds 3.0 μm, it is undesirable that the breaking strength of the film is lowered to easily break the film and insulation defects are sometimes caused. When the average particle diameter of the spherical silica particles (B) is less than 0.01 μm, improving effects on slipperiness or operating efficiency of the film are insufficient. On the other hand, when the average particle diameter exceeds 1.5 μm, it is undesirable that the surface of the film is excessively roughened, and that the film surface between large protrusions cannot be moderately roughened and the collapse load during pressing cannot be reduced.

Thereby, a biaxially oriented polyester film having an average surface roughness of 35 to 75 nm and good in "collapsing property" can be obtained by adding the two kinds of spherical silica fine particles. When the average surface roughness of the film is lower than 35 nm, sufficient slipperiness cannot be obtained and it is difficult to wind the film. Furthermore the pressing load is large and the defective shape of capacitors tends to occur. When the average surface roughness is larger than 75 nm, it means that many particles having a large particle diameter are present, and the breakdown voltage is reduced.

It is preferable to reduce the average particle diameter from the film thickness in order to stably produce the film. Further, the average particle diameter is preferably 90% or less based on the film thickness.

The method for producing the spherical silica particles is not limited at all if the above conditions are satisfied; however, the spherical silica particles can be produced by hydrolyzing, for example, ethyl orthosilicate [$Si(OC_2H_5)_4$], thereby preparing monodispersed spheres of hydrous silica [$Si(OH)_4$], further carrying out dehydrating treatment of the monodispersed spheres of the hydrous silica and three-dimensionally growing the following silica bonds [see Nippon Kagaku Kaishi (Journal of the Chemical Society of Japan), No. 9, p. 1503, 1981].

$$Si(OC_2H_5)_4+4H_2O \rightarrow Si(OH)_4+4C_2H_5OH$$

$$\equiv Si—OH+HO—Si\equiv \rightarrow \equiv Si—O—Si\equiv +H_2O$$

($\equiv$Si—O—Si$\equiv$ . . . silica bond)

The amounts of the added spherical silica particles (A) and (B) in the present invention are preferably 0.03 to 1.5% by weight and 0.05 to 2% by weight, respectively. When the amount of the added spherical silica fine particles (A) is less than 0.03% by weight, the slipperiness or operating efficiency of the film becomes insufficient. On the other hand, when the amount exceeds 1.5% by weight, it is undesirable that the surface hardness or space factor of the film is increased and the breaking strength and breakdown voltage of the film are lowered. When the amount of the spherical silica fine particles (B) is less than 0.05% by weight, the slipperiness or operating efficiency of the film becomes insufficient. On the other hand, when the amount exceeds 2% by weight, it is undesirable that the breakage is increased during the slitting of the film. The total amount of the added spherical silica particles (A) and the spherical silica particles (B) is preferably 3% by weight or less for the reasons mentioned above.

The polyester containing the two kinds of spherical silica fine particles can be produced by adding the spherical silica fine particles (preferably as a slurry in a glycol) into the reaction system in an optional period during polymerizing reaction of the polymer, for example in the transesterification in the case with a transesterification method or in the polycondensation reaction. The spherical silica fine particles are preferably added into the reaction system in the initial period of the polymerizing reaction, for example in a period until the intrinsic viscosity reaches about 0.3. Furthermore, besides the two kinds of silica fine particles, a lubricant having a smaller particle diameter than that of the two kinds of spherical silica fine particles as a third component may be added.

When the film of the present invention contains the spherical silica particles (A) and (B), the number of fly specks having an average diameter exceeding 30 μm is preferably 10 fly specks/$m^2$ or less, more preferably 8 fly specks/$m^2$ or less, especially preferably 5 fly specks/$m^2$ or less. In order to ensure higher insulating performances as a dielectric of capacitors, the frequency of presence of fly specks having an average diameter exceeding 30 μm is preferably 10 fly specks/$m^2$ or less.

<<Coarse Particles>>

The number of coarse particles having the maximum diameter exceeding 40 μm present in a polyester film for capacitors of the present invention is preferably smaller and preferably 10 coarse particles/$m^2$ or less, more preferably 8 coarse particles/$m^2$ or less, especially preferably 5 coarse particles/$m^2$ or less. When the number of coarse particles having the maximum diameter exceeding 40 μm exceeds 10 coarse particles/$m^2$, it is undesirable that the frequency of parts where the thickness of the resin around the coarse particles is small is increased and the insulating performances as a dielectric of the capacitors become insufficient. For the same reasons, the number of coarse particles having the maximum diameter exceeding 35 μm is preferably smaller, preferably 10 coarse particles/$m^2$ or less, more preferably 8 coarse particles/$m^2$ or less, especially preferably 5 coarse particles/$m^2$ or less.

<<Additives>>

Additives, for example a lubricant, a stabilizer or a flame retardant can be contained in the polyester film for capacitors of the present invention. In order to impart slipperiness to the film, inert fine particles such as inorganic particles, organic particles or cross-linked polymer particles in a small proportion are preferably contained for the purpose of improving the runnability or handleability during production, processing and use of the film.

Examples of the inorganic particles include calcium carbonate, porous silica, spherical silica, kaolin (platy aluminum silicate), talc, magnesium carbonate, barium carbonate, calcium sulfate, barium sulfate, lithium phosphate, calcium phosphate, magnesium phosphate, aluminum oxide, silicon oxide, titanium oxide, zirconium oxide and lithium fluoride.

Examples of the organic salt particles include calcium oxalate, terephthalates of calcium, barium, zinc, manganese and magnesium.

Examples of the cross-linked polymer particles include homopolymers or copolymers of vinylic monomers of divinylbenzene, styrene, acrylic acid, methacrylic acid, acrylic acid or methacrylic acid. In addition, organic fine particles such as polytetrafluoroethylene, silicone resins, benzoguanamine resins, thermosetting epoxy resins, unsaturated polyester resins, thermosetting urea resins, thermosetting phenol resins and the like can be used.

The particle diameter of the inert fine particles is preferably 0.1 to 5 μm expressed in terms of the average particle diameter. The average particle diameter is more preferably 0.15 μm or more and 4 μm or less, especially preferably 0.2 μm or more and 3 μm or less. When the average particle diameter is less than 0.1 μm, it is undesirable that improving effects on slipperiness are small, and that the addition concentration, therefore, must be extremely increased to increase the breakage in the production process for the film. When the average particle diameter exceeds 5 μm, it is undesirable that not only the breakage is increased but also pinholes due to falling of particles are increased.

In the present invention, the "average particle diameter" of the inert fine particles means the "equivalent spherical diameter" of particles located in a point of 50% by weight based on all the measured particles. The "equivalent spherical diameter" means the diameter of imaginary spheres (ideal spheres) having the same volume as that of the particles and can be determined by calculation from measurement of the particles under an electron microscope or by a usual settling method.

The total amount of the added inert fine particles is 0.05 to 3% by weight, more preferably 0.08 to 2.5% by weight, especially preferably 0.1 to 2.0% by weight. When the amount is less than 0.05% by weight, improving effects on slipperiness are insufficient. When the amount exceeds 3% by weight, it is undesirable that breakage is increased in the production process for the film.

The inert fine particles to be added to the film may be a single component selected from the exemplified particles or many components containing two or three or more components. Particularly in the polyester film for capacitors of the present invention, it is especially preferable to contain calcium carbonate and platy aluminum silicate in the above exemplified p articles.

A nucleating agent, an antioxidant, a heat stabilizer, a lubricant, a flame retardant, an antistatic agent, a polysiloxane and the like can be compounded in the polyester film of the present invention according to the use thereof.

The time for adding inert fine particles or other additives is not especially limited if the time is in a stage until polyethylene-2,6-naphthalenedicarboxylate is formed into a film, and for example the inert fine particles or other additives may be added in a polymerizing stage or during the film formation. From the viewpoint of uniform dispersion, it is preferable to add the inert fine particles or other additives into ethylene glycol, add the inert fine particles or other additives at a high concentration during the polymerization and provide master chips, which are diluted with chips without addition.

<<Method for Production>>

The polyester film for capacitors of the present invention can be produced by a usual method for producing a biaxially stretched polyester film.

For example, the polyester film for capacitors can be produced by melting polyethylene-2,6-naphthalenedicarboxylate at a temperature not lower than the melting point thereof, extruding the melt from a die slit onto a casting drum at a controlled temperature in the vicinity of 60° C., bringing the extruded melt into close contact with the casting drum, cooling and solidifying the film, providing an unstretched film, then biaxially stretching the unstretched film in the machine direction and the transverse direction, subsequently heat-setting the film, if necessary, subjecting the heat-set film to relaxing treatment in the machine direction and/or the transverse direction. In the present invention, it is necessary to adjust the thermal strain ratio RMD (150) of the film in the machine direction at 150° C. within the range of −1.5 to 0.01%. For that purpose, the biaxial stretching is preferably carried out by simultaneous biaxial stretching. The stretching of the film can be conducted by using a known roll type longitudinal stretching machine, infrared heating longitudinal stretching machine, tenter clip type transverse stretching machine, multistage stretching machine for carrying out the stretching in divided plural stages, tubular stretching machine, oven type longitudinal stretching machine, simultaneous biaxial stretching machine and the like. Above all, the simultaneous biaxial stretching machine is preferable.

The method for producing the polyester film of the present invention will be explained in more detail hereinafter.

The production by the simultaneous biaxial stretching method will be initially explained.

There have hitherto been a screw method for extending the clip interval by carrying clips in screw channels and a pantograph method for extending the clip interval using the pantograph in the stretching mechanism in the machine direction of the simultaneous biaxial stretching machine. The methods are not always ideal from the viewpoint that the film forming speed is low and a change in conditions such as stretch ratio is not easy; however, the methods can be used as a stretching means in working the present invention.

On the other hand, a linear motor type simultaneous biaxial stretching machine has recently been developed and has attracted attention due to a high film formation speed and the like. The problems can be solved by the linear motor type simultaneous biaxial stretching tenter at a stroke. Thereby, the linear motor type simultaneous biaxial stretching machine is preferably used as a stretching means in working the present invention. The simultaneous biaxial stretching machine has advantages in that flaws on the film surface are reduced because longitudinal stretching rollers as in sequential biaxial stretching are not used. Furthermore, planes of the benzene rings or naphthalene rings tend to be parallel to the film surface by the sequential biaxial stretching and the refractive index nz in the thickness direction is decreased. The tear propagation resistance is small and delamination is readily caused. On the other hand, the defects are improved by the simultaneous biaxial stretching. There is a structure capable of longitudinally relaxing the film in a heat-setting region in the simultaneous biaxial stretching machine and the thermal strain ratio in the machine direction at 150 to 210° C. can be reduced. Since the preferable characteristics of the simultaneous biaxial stretching machine are advantageous to production of the polyester film for capacitors of the present invention, the polyester film for capacitors of the present invention is preferably produced by the simultaneous biaxial stretching.

The simultaneous biaxial stretching described in the present invention is stretching for simultaneously imparting orientation in the machine direction and the transverse direction of the film and refers to operations to transport the film while holding both ends of the film with clips and stretch the film in the machine direction and the transverse direction using a simultaneous biaxial stretching machine. Further, the machine direction of the film is the longitudinal direction of the film and the transverse direction of the film is the width direction of the film. Naturally, there may be parts where stretching in the machine direction and the transverse direction is simultaneously carried out with time and a method for solely prestretching the film in the transverse direction or the machine direction and then simultaneously stretching the film in the machine direction and the transverse direction, a method for simultaneously biaxially stretching the film and then further solely stretching the film in the transverse direction or the machine direction and the like, therefore, are included in the scope of the present invention.

In order to produce the polyester film for capacitors of the present invention, prescribed inert fine particles, i.e. necessary inert fine particles in calcium carbonate particles, platy ammonium silicate particles, porous silica and spherical silica and further, if necessary, other inert fine particles are contained in the polymer and then melt extruded at a usual extruding temperature, i.e. a temperature not lower than the melting temperature (hereinafter referred to Tm) and not higher than (Tm+70)° C., and the melt extruded filmlike melt is subsequently quenched on the surface of a rotating cooling drum to provide an unstretched film having an intrinsic viscosity of, for example 0.40 to 0.90 dl/g.

Preferable conditions for obtaining the unstretched film by using polyethylene-2,6-naphthalenedicarboxylate polymer are 170° C. and about 6 hours for drying the polymer, an extruding temperature of the polymer in the vicinity of 300° C. and the surface temperature of a cooling drum of about 60° C. The ratio of the thickness at the end to the central part-of the unstretched film (thickness at the end/thickness in the central part) is preferably 1 or more and 10 or less, more preferably 1 or more and less than 5, far more preferably 1 or more and less than 3. When the ratio of the thickness is less than 1 or exceeds 10, it is undesirable that the film breakage or film slip off the clip at the production occurs.

The resulting unstretched film is led to a simultaneous biaxial stretching machine by holding both ends of the unstretched film with clips, heated in a preheating zone [glass transition point temperature Tg of the polyester −40] to (Tg+50)° C. in the preheating zone and then simultaneously biaxially stretched at (Tg−10) to (Tg+70)° C. at an area ratio of 10 to 40 times (longitudinal ratio of 2 to 6 times) in one stage or many stages of two or more stages.

The stretched film, if necessary, may then be simultaneously biaxially stretched at a temperature within the range of (melting point Tm of the polyester −120) to (Tm−10)° C. at an area ratio of 2 to 5 times in one stage or many stages of two or more stages, subsequently heat-set at a temperature within the range of (Tm−70) to (Tm)° C. and, if necessary, subjected to relaxing treatment within a temperature range of preferably 100 to 245° C. in the machine direction and the transverse direction at a ratio within the range of 1 to 10% for each direction in a cooling process from heat-setting while, if necessary, carrying out the heat-setting.

When the unstretched film of polyethylene-2,6-naphthalenedicarboxylate is stretched, preferable conditions are a preheating temperature of about 140° C., a stretching temperature of about 145° C. and a heat-setting temperature of about 240° C. The film is subjected to relaxing treatment in the machine direction and the transverse direction while, if necessary, carrying out the heat-setting, then cooled to room temperature and wound to afford the objective simultaneous biaxially stretched polyester film.

In the present invention, the surface of the polyester film is preferably coated with a coating agent in a step before or after the simultaneous biaxial stretching in order to impart surface characteristics of the film, for example easy adhesion, slipperiness, mold release properties and antistatic properties.

Furthermore, the polyester film for capacitors of the present invention can be produced by usual sequential biaxial stretching. The unstretched polyethylene-2,6-naphthalenedicarboxylate film obtained by a known method is stretched at 120 to 180° C., more preferably 125 to 170° C., especially preferably 130 to 160° C. in the machine direction at 3.0 to 5.0 times, more preferably 3.3 to 4.6 times by a roll type longitudinal stretching machine. An infrared heating type longitudinal stretching machine may be used; however, a roll type longitudinal stretching machine is preferable that it is advantageous to uniform heating of the whole film especially when a thin film is stretched. The stretching is preferably carried out in plural divided stages in order to reasonably stretch the film by longitudinal stretching. After the longitudinal stretching, the resulting film is then stretched at 120 to 180° C., more preferably 125 to 170° C., especially preferably 130 to 160° C. in the transverse direction at 3.0 to 4.5 times, more preferably 3.5 to 4.3 times, heat-treated at preferably 195 to 250° C., more preferably 205 to 245° C. for 0.3 to 50 seconds and then subjected to heat relaxing treatment in the machine direction and/or the transverse direction at a relaxing ratio within the range of 0.5 to 15% in a stenter. Thereby, the polyester film for capacitors of the present invention can be obtained. Further, multistage stretching in which the stretching in the transverse direction is divided in plural stages may be used.

Furthermore, in order to adjust the number of fly specks having an average diameter exceeding 60 μm, 55 μm and 30 μm within the above range, the molten polymer is preferably filtered out through a nonwoven fabric type filter which comprises stainless steel fine wires having a wire diameter of 15 μm or less and has an average sieve opening of 10 to 40 μm, preferably 15 to 35 μm, more preferably 10 to 35 μm, especially preferably 15 to 30 μm as a filter during the film formation. When the sieve opening of the filter exceeds 40 μm, there are no effects on reduction of coarse particles in the molten polymer. On the other hand, when the sieve opening is less than 10 μm, the clogging of the filter tends to occur and the industrial practical use is difficult. In addition, there are filters of a netlike structure or using a sintered metal or the like; however, there are problems that the life is shorter than that of the nonwoven fabric type filter and the filtration efficiency is somewhat inferior and the like. Furthermore, in order to more effectively adjust the number of fly specks having a large size within the above range, the lubricant itself is preferably filtered through the filter having a prescribed sieve opening and then added into the polymer.

The polyester film of the present invention is used as a dielectric of film capacitors and is preferably applied to film capacitors used in places at a higher service environmental temperature because the glass transition temperature of the dielectric film is higher than that of the conventional polyester (polyethylene terephthalate) film capacitors. In particular, the polyester film is preferably used in rectifier circuits more adjacent to heat sources than conventional rectifier circuits due to miniaturization of electrical and electronic equipment, circuits of electrical instrumentation parts installed around engines or in vehicles as electrical instrumentation parts of automobiles and the like because the service environmental temperature becomes high temperatures. The polyester film is preferably used as a film for capacitors requiring withstand voltage characteristics under high voltages or stabilization of capacity under a high frequency such as transformer circuits, current converting circuits and the like of hybrid cars, electric cars, electronic exchanges and the like.

EXAMPLES

The present invention will be explained in more detail with Examples. Various physical properties or methods for measuring the characteristics and definitions in the present invention are as follows.

(1) Calculation of Amounts of Components (Molar Ratio of the Principal Component and Molar Ratios of Copolymerization Component) of polyethylene-2,6-naphthalenedicarboxylate A film sample was dissolved in a measuring solvent ($CDCl_3$:$CF_3COOD$=1:1), and $^1$H-NMR measurement was then carried out to calculate the amounts of the components using integral ratios of the resulting respective signals.

(2) Thermal Strain Ratio

Sampling into a strip form of 4 mm in width long in the film machine direction (MD) was carried out and the sample was heated up from room temperature at a heat-up rate of 5° C./min in a state of an applied constant load of 2.0 MPa in the machine direction by using a measurement module TMA/SS120C model manufactured by Seiko Instruments Inc. and a thermal analysis system SSC/5200H model manufactured by the same company as a data analyzer. The length of the film was measured at 35° C., 150° C. and 210° C. and the thermal strain ratio RMD in the machine direction was calculated by the calculating formula. The thermal strain ratio RTD in the transverse direction (TD) was obtained according to the procedures described above except that a sample long in the transverse direction (TD) was cut out.

(3) Fly Specks

The film surface was magnified 50 times by illumination with polarized light transmission using a universal measuring projector and fly specks present in an area of 1 m$^2$ were observed and marked. The respective fly specks were observed under an optical microscope to determine the average diameter, i.e. (major axis+minor axis)/2 including nuclei of the fly specks and voids formed around the nuclei. The numbers of the fly specks having an average diameter exceeding 60 μm, 55 μm and 30 μm were counted, respectively.

(4) Coarse Particles

The film surface was magnified 50 times by illumination with transmission using a universal measuring projector and a measuring area of 1 m$^2$ was observed to count the numbers of particles having the maximum diameter exceeding 35 μm and the number of particles having the maximum diameter exceeding 40 μm in particles present in the film.

(5) 5% Strain Strength (F5 Value)

A film cut into a sample width of 10 mm and a length of 150 mm and pulled at a length zipping the sample both-side (i.e. marking length of sample) of 100 mm, a tensile speed of 100 mm/min and a chart speed of 500 mm/min using an Instron type universal tensile tester. Measurement in both the the directions of MD and TD was carried out and the strength at 5% elongation was read from the resultant load-elongation curve and divided by the original cross-sectional area to obtain the 5% strain strength (N/mm$^2$). The F5 value in the MD direction was divided by the F5 value in the TD direction to calculate the machine direction/ransverse direction ratio.

(6) Surface Roughness (Center Line Average Height: Ra, Ten-Point Average Roughness: Rz)

The center line average height (Ra) was a value defined by JIS B 0601. In the present invention, the protrusion profile on the film surface was measured under conditions of a measuring length (Lx) of 1 mm, a sampling pitch of 2 μm, a cutoff of 0.25 mm, a magnification of 10000 times in the thickness direction, a magnification in the planar direction of 200 times and a number of scanning lines of 100 (Ly=0.2 mm) with semiconductor laser at a wavelength of 780 nm and an optical stylus having a beam diameter of 1.6 μm using a non-contact type three-dimensional roughness measuring instrument (T-30HK manufactured by Kosaka Laboratory Ltd.). Thereby, the surface roughnesses (Ra and Rz) were calculated.

(7) Density

The density was measured by a sink-and-float method with a density gradient tube using an aqueous solution of calcium nitrate at 25° C.

(8) Film Thickness and Dispersion of Thickness

Fifty samples having a size of length 10 cm×width 10 cm were collected from optional sites of a formed film at an interval of 10 cm or more in both the machine direction and the transverse direction. The thicknesses (μm) T1, T2 . . . T50 of the respective samples were calculated from the width (cm), length (cm), weight (g) and density (g/cm$^3$) by the following formulae to obtain the average thickness Tav of the 50 samples. Thereby, the film thickness was determined. The difference between the maximum thickness Tmax and the minimum thickness Tmin in the 50 samples was obtained to calculate the ratio to the average thickness Tav by the following formulae to provide the dispersion of the thickness.

Thickness (μm)=[weight/(width×length×density)×10000

Average thickness Tav (μm)=(T1+T1+ . . . +T50)/50

Dispersion of thickness (%)=[(Tmax−Tmin)/average thickness Tav]×100

(9) Average Particle Diameter of Inert Fine Particles

The average particle diameter was measured by using CP-50 model Centrifugal Particle Size Analyzer) manufactured by Shimadzu Corp., and the particle diameter corresponding to 50% by weight was read from a cumulative curve of particles having the respective particle diameters and the amount of the presence thereof calculated on the basis of the resulting centrifugal settling curve [see "Technique of Particle Size Measurement", published by THE NIKKAN KOGYO SHINBUN LTD., 1975, pp. 242–247].

(10) Particle Diameter Ratio of Inert Fine Particles a) In the Case of Particles in Film A small piece of a sample film was fixed on a stage for a scanning type electron microscope and ion etching treatment of the film surface was carried out under the following conditions using a sputtering apparatus (JFC-1100 model ion sputtering apparatus) manufactured by JEOL Ltd. The conditions were as follows. The sample was placed in a bell jar, and the ion etching treatment was carried out in a vacuum state of about $10^{-3}$ Torr under a voltage of 0.25 kV at a current of 12.5 mA for about 10 minutes. The film surface was then subjected to gold sputtering with the same apparatus and observed under a scanning type electron microscope at a magnification of 10000 to 30000 times, and the major axis and minor axis of at least 200 particles were measured with Luzex 500 manufactured by Nippon Regulator Co., Ltd. The total of the measured values were divided by the number of measurement for each of the major axis and minor axis to determine the average major axis and average minor axis. The particle diameter ratio was obtained from the average major axis and the average minor axis.

b) In the Case From Powder

Particle powder was scattered on the stage of an electron microscope with the least possible overlapping of the individual particles, and the surface of a gold film vapor deposition layer was formed on the surface with a gold sputtering apparatus to a thickness of 200 to 300 angstroms and observed at a magnification of 10000 to 30000 times under a scanning type electron microscope. The major axis and minor axis of at least 100 particles (measured values in Table 2) or at least 200 particles (measured values in Table 3) were measured with Luzex 500 manufactured by Nippon Regulator Co., Ltd., and the average value of the respective values were calculated in the same manner as in the above a) to determine the particle diameter ratio.

(11) Pore Volume

The pore volume was measured by a nitrogen adsorption and desorption method and calculated by a BET formula.

(12) Film-Forming Properties of Film

The film-formed state of the film when the biaxially stretched film was continuously formed for 24 hours was observed and evaluated according to the following criteria.

◎: The frequency of breakage is 0/24 hours and extremely stable film formation can be carried out.

○: The frequency of breakage is 1 to 3 times/24 hours and stable film formation can be carried out.

X: The frequency of breakage is 4 times or more/24 hours and film formation is unstable.

(13) Take-Up Form of Film Roll

The take-up form of a film roll after winding into a roll at a width of 550 mm and a length of 10000 m was respectively observed during the film formation and the slitting of the film and after vapor deposition in capacitor processing and evaluated according to the following criteria.

◎: No surface crease, wander and the like by observation with naked eyes during the film formation and the slitting of the film and after vapor deposition and good take-up form.

X: Surface creases, wander and the like are confirmed by observation with naked eyes during the film formation and the slitting of the film and/or vapor deposition and the take-up form is poor.

(14) Insulation Resistance

Two hundred capacitor samples of 0.1 μF were placed under an atmosphere at 23° C. and 65% RH and insulation resistance was measured as a value of 1 minute under an applied voltage of 500 V with a superinsulation resistance meter 4329A model manufactured by Yokogawa Hewlett Packard Ltd. Capacitor samples having an insulation resistance of less than 5000 MΩ were taken as defectives and judged according to the following criteria. In the invention, ◎ and Δ were regarded as passing the inspection.

◎: Less than 4 defectives.

Δ: Four or more and less than 10 defectives

X: Ten or more defectives.

(15) Breakdown Voltage (BDV)

The breakdown voltage was measured according to the method defined by JIS C 2318, and the minimum of n=200 was the breakdown voltage (BDV). In the present invention, the breakdown voltage is preferably 220 V/μm or more, especially preferably 240 V/μm or more.

Example 1

Transesterification was carried out by using 100 parts of dimethyl 2,6-naphthalenedicarboxylate, 60 parts of ethylene glycol and 0.03 part of manganese acetate tetrahydrate as a transesterification catalyst and adding calcium carbonate particles having an average particle diameter of 1.0 μm and kaolin clay particles (platy aluminum silicate particles) having an average particle diameter of 0.7 μm so as to contain 0.45% by weight of the calcium carbonate particles and 0.30% by weight of the kaolin clay particles according to a conventional method and 0.023 part of trimethyl phosphate was then added to substantially complete the transesterification.

To the reaction mixture, was then added 0.024 part of antimony trioxide. The polymerizing reaction was subsequently carried out at a high temperature and high decompression according to a conventional method to provide a polyethylene-2,6-naphthalenedicarboxylate having an intrinsic viscosity of 0.62 dl/g (PEN Tg=121° C.). The resulting PEN polymer was then dried at 170° C. for 5 hours, subsequently fed to an extruder, melted at a melting temperature of 295° C., filtered through a nonwoven fabric type filter comprising stainless steel fine wires having a wire diameter of 14 μm and an average sieve opening of 30μ, extruded through a die slit and then cooled and solidified on a casting drum to prepare an unstretched film.

The obtained unstretched film was introduced into a simultaneous biaxial stretching machine, preheated at 140° C. and then simultaneously stretched at 4.5 times in the machine direction and 4.2 times in the transverse direction at 145° C. while holding the film with clips. The stretched film was then respectively heat-set at 200° C., 230° C. and 235° C. in the first, second and third heat-setting zone for 2 seconds each to impart 3% longitudinal relaxation and afford a biaxially oriented film having a thickness of 3.0 μm. Table 1 shows physical properties and evaluation results of the biaxially oriented film.

The resulting polyester film was treated at 70° C. for 24 hours after the passage of 1 week from the film formation and one surface was then subjected to vacuum evaporation of aluminum so as to afford a surface resistance value of 2 Ω/□. In the process, the vapor deposition was carried out so as to provide a stripe form having marginal parts running in the longitudinal direction (repetition of a width of 58 mm in the vapor deposition part and a width of 2 mm of the marginal parts). The resulting vapor deposited film was then subjected to voltage treatment for applying a direct current 800 V to the full width of the film and blades were inserted into the center of the respective vapor deposited parts and the center of the respective marginal parts to carry out slitting. Thereby, a tapelike wound reel having the full width of 30 mm with a margin of 1 mm in the left or right was obtained.

Each sheet of the resulting reel of the left margin and right margin was superimposed and wound to afford a piece of capacitor having an electrostatic capacity of 0.1 μF. The piece of capacitor was pressed at a temperature of 150° C. under a pressure of 196 MPa for 5 minutes. Metallicon was thermally sprayed on both end faces thereof to provide external electrodes. Lead wires were then welded to the metallicon and externally packaged and cured with an epoxy resin to provide a rolled type capacitor. Table 1 shows the evaluation results as the capacitor. The capacitor had a breakdown voltage as high as 270 V/μm and was excellent in insulation resistance characteristics and especially excellent in film-forming properties.

Example 2

The amount of the inert fine particles to be added was adjusted to that mentioned in Table 1 and an unstretched film was prepared in the same manner as in Example 1. The resulting film was stretched at 135° C. in the machine direction (longitudinal direction) at 1.8 times, then sequentially stretched at 145° C. in the machine direction at 2 times (longitudinal stretching ratio of 3.6 times) and stretched at 140° C. in the transverse direction (width direction) at 3.6 times and subsequently heat-set at 232° C. for 3 seconds to afford a biaxially oriented film having a thickness of 3.0 μm, which was wound into a roll. The film simple material was evaluated and a piece of capacitor was prepared in the same manner as in Example 1 and evaluated. Table 1 shows the results. The capacitor had a breakdown voltage as high as 260 V/μm and excellent in insulation resistance characteristics.

Reference Example 1

Procedures were carried out in the same manner as in Example 1, except that the average sieve opening of the melt filtering filter was adjusted to 50 μm. Thereby, a film was formed to prepare a piece of capacitor, which was evaluated. Table 1 shows the results. The capacitor had many fly specks and a low breakdown voltage.

Comparative Example 1

A film was formed in the same manner as in Example 1, except that the heat-setting temperature was 200° C. in each zone without imparting longitudinal relaxing. A piece of capacitor was prepared and evaluated. Table 1 shows the results. The piece of capacitor has a large thermal strain ratio in the machine direction at 150° C. on the negative side and defective shapes of capacitor frequently occurred.

Comparative Example 2

The stretching conditions were changed into those mentioned in Table 1 in Example 2. Table 1 shows the evaluation results of the film and piece of capacitor. The resulting piece of capacitor has a large thermal strain ratio in the machine direction at 150° C. on the positive side and a low insulation resistance.

TABLE 1

| | | Example 1 | Example 2 | Reference Example 1 | Comparative Example 1 | Comparative Example 2 |
|---|---|---|---|---|---|---|
| Polyester | | Polyethylene-2,6-naphthalenedicarboxylate | | | | |
| Kind of lubricant | Lubricant 1 | Calcium carbonate | Calcium carbonate | Calcium carbonate | Calcium carbonate | Calcium carbonate |
| | Lubricant 2 | Kaolin clay | Kaolin clay | Kaolin clay | Kaolin clay | Kaolin clay |
| Average particle diameter (μm) | Lubricant 1 | 1.0 | 1.0 | 1.0 | 1.0 | 1.0 |
| | Lubricant 2 | 0.7 | 0.7 | 0.7 | 0.7 | 0.7 |
| Addition concentration (% by weight) | Lubricant 1 | 0.45 | 0.45 | 0.45 | 0.45 | 0.45 |
| | Lubricant 2 | 0.30 | 0.25 | 0.30 | 0.30 | 0.25 |

TABLE 1-continued

| | | Example 1 | Example 2 | Reference Example 1 | Comparative Example 1 | Comparative Example 2 |
|---|---|---|---|---|---|---|
| Stretching method | | Simultaneous biaxial | Sequential biaxial | Simultaneous biaxial | Simultaneous biaxial | Sequential biaxial |
| Stretching ratio | Machine direction | 4.5 | 3.6 | 4.5 | 4.5 | 2.3 |
| | Transverse direction | 4.2 | 3.6 | 4.2 | 4.2 | 3.3 |
| Heat-setting temperature (°C.) | | 235 | 232 | 235 | 200 | 245 |
| Thickness (μm) | | 3.0 | 3.0 | 3.0 | 3.0 | 3.0 |
| Dispersion of thickness (%) | | 9 | 12 | 9 | 8 | 35 |
| Fly specks Average diameter >60 μm (fly specks/m2) | | 5 | 5 | 36 | 5 | 5 |
| Coarse particles Maximum diameter >35 μm (coarse particles/m2) | | 4 | 4 | 47 | 4 | 4 |
| 5% strain strength (MPa) | MD | 156 | 138 | 154 | 160 | 115 |
| | TD | 140 | 136 | 138 | 142 | 130 |
| Machine direction/transverse direction ratio of 5% strain strength (MD/TD) | | 1.11 | 1.01 | 1.12 | 1.13 | 0.88 |
| Surface roughness (nm) | Ra | 64 | 62 | 68 | 63 | 61 |
| Intrinsic viscosity (dl/g) | 0.54 | 0.54 | 0.54 | 0.54 | 0.54 | 0.54 |
| Density (g/cm3) | 1.353 | 1.353 | 1.353 | 1.353 | 1.351 | 1.356 |
| Thermal strain ratio (%) | RMD (150) | −1.0 | −1.2 | −1.0 | −1.6 | 0.5 |
| | RTD (150) | −0.7 | −0.8 | −0.7 | −0.8 | 0.1 |
| | RMD (210) | −2.3 | −2.5 | −2.3 | −3.7 | 0.1 |
| | RTD (210) | −2.0 | −2.1 | −2.0 | −2.8 | −0.8 |
| Film-forming property of film | | ◎ | ○ | X | ◎ | ○ |
| Take-up form of film roll | | ◎ | ◎ | ◎ | ◎ | X |
| Breakdown voltage (V/μm) | | 270 | 260 | 150 | 270 | 220 |
| Insulation resistance of a piece of capacitor | | ○ | ○ | Δ | ○ | X |

Example 3

Transesterification was carried out by using 100 parts of dimethyl 2,6-naphthalenedicarboxylate and 60 parts of ethylene glycol and 0.03 part of manganese acetate tetrahydrate as a transesterification catalyst and adding porous silica particles having an average particle diameter of 2.0 μm and a pore volume of 1.2 ml/g and spherical silica particles having an average particle diameter of 0.6 μm so as contain 0.35% by weight of the porous silica particles and 0.30% by weight of the spherical silica particles according to a conventional method and 0.023 part of trimethyl phosphate was then added to substantially complete the transesterification.

To the reaction mixture, was then added 0.024 part of antimony trioxide. The polymerizing reaction was subsequently carried out at a high temperature and high decompression according to a conventional method to provide a polyethylene-2,6-naphthalenedicarboxylate having an intrinsic viscosity of 0.62 dl/g (PEN Tg=121° C.). The resulting PEN polymer was then dried at 170° C. for 5 hours, subsequently fed to an extruder, melted at a melting temperature of 295° C., filtered through a nonwoven fabric type filter comprising stainless steel fine wires having a wire diameter of 14 μm and an average sieve opening of 30μ, extruded through a die slit and then cooled and solidified on a casting drum to prepare an unstretched film.

The obtained unstretched film was introduced into a simultaneous biaxial stretching machine, preheated at 140° C. and then simultaneously stretched at 4.4 times in the machine direction and 4.1 times in the transverse direction at 145° C. while holding the film with clips. The stretched film was then respectively heat-set at 200° C., 230° C. and 235° C. in the first, second and third heat-setting zone for 2 seconds each to impart 3% longitudinal relaxation and afford a biaxially oriented film having a thickness of 2.0 μm. Table 2 shows physical properties and evaluation results of the biaxially oriented film.

The resulting polyester film was treated at 70° C. for 24 hours after the passage of 1 week from the film formation and one surface was then subjected to vacuum evaporation of aluminum so as to afford a surface resistance value of 2 Ω/□. In the process, the vapor deposition was carried out so as to provide a stripe form having marginal parts running in the longitudinal direction (repetition of a width of 58 mm in the vapor deposition part and a width of 2 mm of the marginal parts). The resulting vapor deposited film was then subjected to voltage treatment for applying a direct current 800 V to the full width of the film and blades were inserted into the center of the respective vapor deposited parts and the center of the respective marginal parts to carry out slitting. Thereby, a tapelike wound reel having the full width of 30 mm with a margin of 1 mm in the left or right was obtained.

Each sheet of the resulting reel of the left margin and right margin was superimposed and wound to afford a piece of capacitor having an electrostatic capacity of 0.1 μF. The piece of capacitor was pressed at a temperature of 150° C. under a pressure of 196 MPa for 5 minutes. Metallicon was thermally sprayed on both end faces thereof to provide external electrodes. Lead wires were then welded to the metallicon and externally packaged and cured with an epoxy resin to provide a rolled type capacitor. Table 1 shows the evaluation results as the capacitor. The capacitor had a breakdown voltage as high as 270 V/μm and was excellent in insulation resistance characteristics.

Example 4

The average particle diameter of the inert fine particles to be added was changed to, that mentioned in Table 2 and an unstretched film was prepared in the same manner as in Example 3. The resulting film was stretched at 1.7 times in the machine direction (longitudinal direction) at 135° C., then sequentially biaxially stretched at 145° C. in the machine direction at 2 times (longitudinal stretching ratio of 3.4 times) and stretched at 140° C. in the transverse direction (width direction) at 3.5 times and subsequently heat-set at 232° C. for 3 seconds to afford a biaxially oriented film having a thickness of 2.0 μm, which was wound into a roll. The film simple material was evaluated and a piece of capacitor was prepared in the same manner as in Example 1 and evaluated. Table 1 shows the results. The capacitor had a breakdown voltage as high as 270 V/μm and was excellent in insulation resistance characteristics.

Reference Example 2

Procedures were carried out in the same manner as in Example 3, except that the average sieve opening of the melt filtering filter was adjusted to 50 μm. Thereby, a film was formed to prepare a piece of capacitor, which was evaluated. Table 2 shows the results. The capacitor had many fly specks and a low breakdown voltage.

Comparative Example 3

Procedures were carried out in the same manner as in Example 3, except that the lubricant composition was adjusted to that shown in Table 2 and the heat-setting temperature in each zone was adjusted to 190° C. without imparting longitudinal relaxation. Thereby, a film was 15 formed to prepare a piece of capacitor, which was evaluated. Table 2 shows the results. The capacitor had a large thermal strain ratio in the machine direction at 150° C. on the negative side and defective shapes frequently occurred.

Comparative Example 4

Stretching conditions were changed to those mentioned in Table 2 in Example 4. Table 1 shows evaluation results of the resulting film and the piece of capacitor. The obtained piece of capacitor had a large thermal strain ratio in the machine direction at 150° C. on the positive side and a low insulation resistance.

Example 5

Transesterification was carried out by using 100 parts of dimethyl 2,6-naphthalenedicarboxylate, 60 parts of ethylene glycol and 0.03 part of manganese acetate tetrahydrate as a transesterification catalyst and adding spherical silica particles (A) having a particle diameter ratio of 1.1 and an average particle diameter of 1.0 μm and spherical silica particles (B) having a particle diameter ratio of 1.1 and an average particle diameter of 0.5 μm so as to contain 0.40% by weight of the spherical silica particles (A) and 0.30% by weight of the spherical silica particles (B) according to a conventional method and 0.023 part of trimethyl phosphate was then added to substantially complete the transesterification. The particle diameter ratio of the spherical silica particles used is each 1.1 in any of Examples and Comparative Examples.

To the reaction mixture, was then added 0.024 part of antimony trioxide. The polymerizing reaction was subsequently carried out at a high temperature and high decompression according to a conventional method to provide a polyethylene-2,6-naphthalenedicarboxylate having an intrinsic viscosity of 0.62 dl/g (PEN Tg=121° C.). The resulting PEN polymer was then dried at 170° C. for 5 hours, subsequently fed to an extruder, melted at a melting temperature of 295° C., filtered through a nonwoven fabric type filter comprising stainless steel fine wires having a wire diameter of 14 μm and an average sieve opening of 30μ, extruded through a die slit and then cooled and solidified on a casting drum to prepare an unstretched film.

The obtained unstretched film was introduced into a simultaneous biaxial stretching machine, preheated at 140°

TABLE 2

| | | Example 3 | Example 4 | Reference Example 2 | Comparative Example 3 | Comparative Example 4 |
|---|---|---|---|---|---|---|
| Polyester | | Polyethylene-2,6-naphthalenedicarboxylate | | | | |
| Kind of lubricant | Lubricant 1 | Porous silica | Porous silica | Porous silica | Porous silica | Porous silica |
| | Lubricant 2 | Spherical silica | Spherical silica | Spherical silica | — | Spherical silica |
| Average particle diameter | Lubricant 1 | 2.00 | 1.80 | 2.00 | 0.50 | 1.80 |
| (μm) | Lubricant 2 | 0.60 | 0.60 | 0.60 | — | 0.60 |
| Addition concentration | Lubricant 1 | 0.35 | 0.35 | 0.35 | 0.20 | 0.35 |
| (% by weight) | Lubricant 2 | 0.30 | 0.30 | 0.30 | — | 0.30 |
| Particle diameter ratio of lubricant 2 | | 1.1 | 1.1 | 1.1 | 1.1 | 1.1 |
| Stretching method | | Simultaneous biaxial | Sequential biaxial | Simultaneous biaxial | Simultaneous biaxial | Sequential biaxial |
| Stretching ratio | Machine direction | 4.4 | 3.4 | 4.4 | 4.4 | 2.5 |
| | Transverse direction | 4.1 | 3.5 | 4.1 | 4.1 | 3.4 |
| Heat-setting temperature (°C.) | | 235 | 232 | 235 | 190 | 240 |
| Thickness (μm) | | 2.0 | 2.0 | 2.0 | 2.0 | 2.0 |
| Dispersion of thickness (%) | | 10 | 13 | 10 | 8 | 31 |
| Number of coarse particles Maximum diameter >40 μm (coarse particles/m2) | | 3 | 2 | 19 | 0 | 2 |
| Fly specks Average diameter > 55 μm (fly specks/m2) | | 5 | 4 | 34 | 0 | 4 |
| 5% strain strength (MPa) | MD | 150 | 134 | 148 | 158 | 113 |
| | TD | 137 | 136 | 138 | 140 | 133 |
| Machine direction/transverse direction ratio of 5% strain strength (MD/TD) | | 1.09 | 0.99 | 1.07 | 1.13 | 0.85 |
| Surface roughness (nm) | Ra | 72 | 70 | 73 | 13 | 70 |
| | Rz | 1610 | 1660 | 1630 | 380 | 1650 |
| Intrinsic viscosity (dl/g) | | 0.55 | 0.55 | 0.55 | 0.55 | 0.55 |
| Density (g/cm3) | | 1.353 | 1.353 | 1.353 | 1.349 | 1.356 |
| Thermal strain ratio (%) | RMD (150) | −0.8 | −1.1 | −0.8 | −2.0 | 0.5 |
| | RTD (150) | −0.6 | −0.8 | −0.6 | −1.3 | −0.1 |
| | RMD (210) | −2.1 | −2.3 | −2.1 | −4.1 | 0.0 |
| | RTD (210) | −2.0 | −2.0 | −2.0 | −3.2 | −1.2 |
| Film-forming property of film | | ⊚ | ○ | X | ⊚ | ○ |
| Take-up form of film roll | | ⊚ | ⊚ | ⊚ | X | X |
| Breakdown voltage (V/μm) | | 270 | 270 | 170 | 300 | 220 |
| Insulation resistance of a piece of capacitor | | ○ | ○ | Δ | Δ | X |

C. and then simultaneously stretched at 4.2 times in the machine direction and 4.0 times in the transverse direction at 145° C. while holding the film with clips. The stretched film was then respectively heat-set at 210° C., 230° C. and 237° C. in the first, second and third heat-setting zone for 2 seconds each to impart 3% longitudinal relaxation and afford a biaxially oriented film having a thickness of 4.0 μm. Table 3 shows physical properties and evaluation results of the biaxially oriented film.

The resulting polyester film was treated at 70° C. for 24 hours after the passage of 1 week from the film formation and one surface was then subjected to vacuum evaporation of aluminum so as to afford a surface resistance value of 2 Ω/□. In the process, the vapor deposition was carried out so as to provide a stripe form having marginal parts running in the longitudinal direction (repetition of a width of 58 mm in the vapor deposition part and a width of 2 mm of the marginal parts). The resulting vapor deposited film was then subjected to voltage treatment for applying a direct current 800 V to the full width of the film and blades were inserted into the center of the respective vapor deposited parts and the center of the respective marginal parts to carry out slitting. Thereby, a tapelike wound reel having the full width of 30 mm with a margin of 1 mm in the left or right was obtained.

Each sheet of the resulting reel of the left margin and right margin was superimposed and wound to afford a piece of capacitor of an electrostatic capacity of 0.1 μF. The piece of capacitor was pressed at a temperature of 150° C. under a pressure of 196 MPa for 5 minutes. Metallicon was thermally sprayed on both end faces thereof to provide external electrodes. Lead wires were then welded to the metallicon, externally packaged and cured with an epoxy resin to provide a rolled type capacitor. Table 3 shows the evaluation results as the capacitor. The capacitor had a breakdown voltage as high as 290 V/μm and was excellent in insulation resistance characteristics and especially excellent in film-forming properties.

Example 6

The average particle diameter and addition concentration of the inert fine particles to be added as a lubricant was changed to those mentioned in Table 3 and an unstretched film was prepared in the same manner as in Example 5. The resulting film was stretched at 135° C. in the machine direction (longitudinal direction) at 1.9 times, then sequentially biaxially stretched at 145° C. in the machine direction at 2 times (longitudinal stretching ratio of 3.8 times) and stretched at 145° C. in the transverse direction (width direction) at 3.6 times and subsequently heat-set at 234° C. for 3 seconds to afford a biaxially oriented film having a thickness of 4.0 μm, which was wound into a roll. The film simple material was evaluated and a piece of capacitor was prepared in the same manner as in Example 1 and evaluated. Table 1 shows the results. The capacitor had a breakdown voltage as high as 290 V/μm and was excellent in insulation resistance characteristics.

Reference Example 3

Procedures were carried out in the same manner as in Example 5, except that the average particle diameter and the addition concentration of the inert fine particles to be added as a lubricant were changed to those mentioned in Table 3 and a filter having an average sieve opening of 50 μm was used as the melt filtering filter the melt filtering filter. Thereby, a film was formed to prepare a piece of capacitor, which was evaluated. Table 1 shows the results. In this case, no piece of capacitor satisfying the number of fly specks which was the requirement of the present invention was obtained, and merely the breakdown voltage as low as, 190 V/μm was obtained.

Comparative Example 5

Procedures were carried out in the same manner as in Example 5, except that the lubricant composition was adjusted to that shown in Table 3 and the heat-setting temperature in each zone was adjusted to 195° C. without imparting longitudinal relaxation. Thereby, a film was formed to prepare a piece of capacitor, which was evaluated. Table 3 shows the results. The capacitor had a large thermal strain ratio in the machine direction at 150° C. on the negative side and the take-up form of the film roll was poor. Defective shapes of the capacitor frequently occurred.

Comparative Example 6

Procedures were carried out in the same manner as in Example 6, except that the thermal strain ratio of the film was changed by changing the stretching conditions. Thereby, a film was formed to prepare a piece of capacitor, which was evaluated. Table 3 shows the results. The piece of capacitor had a large thermal strain in the machine direction at 150° C. on the positive side and the take-up form of the film roll was poor. The insulation resistance characteristics were inferior.

TABLE 3

| | | Example 5 | Example 6 | Reference Example 3 | Comparative Example 5 | Comparative Example 6 |
|---|---|---|---|---|---|---|
| Polyester | | Polyethylene-2,6-naphthalenedicarboxylate | | | | |
| Kind of lubricant | Lubricant 1 | Spherical silica | Spherical silica | Spherical silica | Spherical silica | Spherical silica |
| | Lubricant 2 | Spherical silica | Spherical silica | Spherical silica | — | Spherical silica |
| Average particle diameter | Lubricant 1 | 1.0 | 2.0 | 3.5 | 0.4 | 2.0 |
| (μm) | Lubricant 2 | 0.5 | 0.2 | 0.6 | — | 0.2 |
| Addition concentration | Lubricant 1 | 0.4 | 0.35 | 0.35 | 0.1 | 0.35 |
| (% by weight) | Lubricant 2 | 0.30 | 0.25 | 0.25 | — | 0.25 |
| Stretching method | | Simultaneous biaxial | Sequential biaxial | Simultaneous biaxial | Simultaneous biaxial | Sequential biaxial |
| Stretching ratio | Machine direction | 4.2 | 3.8 | 4.2 | 4.2 | 2.8 |
| | Transverse direction | 4.0 | 3.6 | 4.0 | 4.0 | 3.2 |
| Heat-setting temperature (° C.) | | 237 | 234 | 237 | 195 | 238 |
| Thickness (μm) | | 4.0 | 4.0 | 4.0 | 4.0 | 4.0 |
| Dispersion of thickness (%) | | 10 | 12 | 10 | 8 | 29 |

TABLE 3-continued

| | | Example 5 | Example 6 | Reference Example 3 | Comparative Example 5 | Comparative Example 6 |
|---|---|---|---|---|---|---|
| Fly specks Average diameter >30 μm (fly specks/m2) | | 2 | 3 | 14 | 0 | 3 |
| 5% strain strength (MPa) | MD | 145 | 140 | 143 | 151 | 124 |
| | TD | 135 | 133 | 135 | 138 | 126 |
| Machine direction/transverse direction ratio of 5% strain strength (MD/TD) | | 1.07 | 1.05 | 1.06 | 1.09 | 0.98 |
| Surface roughness (nm) | Ra | 58 | 64 | 77 | 9 | 62 |
| | Rz | 1200 | 1450 | 1980 | 270 | 1400 |
| Intrinsic viscosity (dl/g) | | 0.52 | 0.52 | 0.52 | 0.52 | 0.52 |
| Density (g/cm3) | | 1.356 | 1.354 | 1.353 | 1.351 | 1.354 |
| Thermal strain ratio (%) | RMD (150) | −0.6 | −1.3 | −0.6 | −1.8 | 0.3 |
| | RTD (150) | −0.6 | −0.7 | −0.6 | −1.3 | 0.0 |
| | RMD (210) | −1.9 | −2.9 | −1.9 | −3.8 | −0.1 |
| | RTD (210) | −1.6 | −2.0 | −1.6 | −3.0 | −1.5 |
| Film-forming property of film | | ◎ | ○ | X | ◎ | ○ |
| Take-up form of film roll | | ◎ | ◎ | ◎ | X | X |
| Breakdown voltage (V/μm) | | 290 | 290 | 190 | 300 | 230 |
| Insulation resistance of a piece of capacitor | | ○ | ○ | Δ | Δ | X |

Effects of the Invention

According to the present invention, there can be provided a film comprising polyethylene-2,6-naphthalenediacrboxylate as a principal component, excellent in insulation characteristics without lowering processing characteristics, especially the characteristics during hot-pressing and suitable as a dielectric for capacitors.

What is claimed is:

1. A polyester film for capacitors which is a biaxially oriented film comprising polyethylene-2,6-naphthalenedicarboxylate as a principal component and having a thermal strain ratio *RMD* (150) of the film in the machine direction at a temperature of 150° C. of $$-1.5\% \leqq RMD\ (150) \leqq 0.0\%$$

when the thermal strain ratio *RMD* (*T*) in the transverse machine direction at a temperature T° C. based on the length *LMD* (*t*) in the machine direction (*MD*) of the film at a temperature t° C. is defined by $$RMD\ (T)=\{[LMD\ (T)-LMD\ (35)]/LMD\ (35)\}\times 100(\%),$$

further wherein the thermal strain ratio *RTD* (150) in the transverse direction of the film at a temperature of 150° C. is $$-1.0\% \leqq RTD\ (150) \leqq 0.0\%$$

when the thermal strain ratio *RTD* (*T*) in the transverse direction of the film at a temperature T° C. based on the length LTD (*t*) in the transverse direction (*TD*) of the film at a temperature t° C. is defined by $$RTD\ (T)=\{[LTD\ (T)-LTD\ (35)]/LTD\ (35)\}\times 100(\%);$$

and wherein the thermal strain ratios *RMD* (210) and *RTD* (210) at a temperature of 210° C. are $$-3.5\% \leqq RMD\ (210) \leqq 0.0\%$$

$$-3.5\% \leqq RTD\ (210) \leqq 0.0\%$$

2. The polyester film for capacitors according to claim 1, characterized in that the ratio of 5% straub strength in the machine direction of the film to the 5% strain strength in the transverse direction of the film is 0.90 or more and 1.40 or less.

3. The polyester film for capacitors according to any one of claim 1 or 2, characterized in that the number of fly specks having an average diameter exceeding 60 μm is 20 fly specks/m$^2$ or less.

4. The polyester film for capacitors according to claim 3, characterized in that 0.03 to 2% by weight of calcium carbonate particles having an average particle diameter of 0.2 to 5 μm is contained and 0.03 to 1% by weight of platy aluminum silicate particles having an average particle diameter of 0.1 to 2 μm is contained.

5. The polyester film for capacitors according to claim 4, characterized in that the number of coarse particles having a maximum diameter exceeding 35 μm is 10 coarse particles/m$^2$ or less.

6. The polyester film for capacitors according to claim 5, characterized in that the film is produced according to a simultaneous biaxial stretching method.

7. The polyester film for capacitors according to any one of claim 1 or 2, characterized in that the number of fly specks having an average diameter exceeding 30 μm is 10 fly specks/m$^2$ or less.

8. The polyester film for capacitors according to claim 7, characterized in that two kinds of spherical silica particles different in average diameter are contained.

9. The polyester film for capacitors according to claim 8, characterized in that the two kinds of spherical silica different in average particle diameter are spherical silica particles (A) having an average particle diameter of 0.5 to 3.0 μm and spherical silica particles (B) having an average particle diameter of 0.01 to 1.5 μm, the spherical silica particles (A) and the spherical silica particles (B) each have a particle diameter ratio, major axis/minor axis, of 1.0 to 1.2, the content of the spherical silica particles (A) is 0.03 to 1.5% by weight and the content of the spherical silica particles (B) is 0.05 to 2% by weight.

10. The polyester film for capacitors according to claim 9, characterized in that the film is produced according to a simultaneous biaxial stretching method.

11. The polyester film for capacitors according to any one of claim 1 or 2, characterized in that the number of coarse particles present in the film and having a maximum diameter exceeding 40 μm is 10 coarse particles/m$^2$ or less.

12. The polyester film for capacitors according to claim 11, characterized in that a porous silica particles and a spherical silica particles are contained, the porous silica particles have an average particle diameter of 0.5 to 5 μm, the spherical silica particles have an average particle diameter of 0.05 to 1.5 μm and less than the film thickness, the spherical silica particles further have a particle diameter ratio, major axis/minor axis, of 1.0 to 1.2, the content of the porous silica particles is 0.05 to 2% by weight and the content of the spherical silica particles is 0.01 to 1% by weight.

13. The polyester film for capacitors according to claim 12, characterized in that a number of fly specks having an average diameter exceeding 55 μm is 15 fly specks/$m^2$ or less.

14. The polyester film for capacitors according to claim 13, characterized in that the film is produced according to a simultaneous biaxial stretching method.

* * * * *